July 30, 1963
A. RAMACCIOTTI
3,099,698
METHOD TO INCREASE THE EFFICIENCY OF A FURNACE
REGENERATOR, PARTICULARLY FOR OPEN-HEARTH
FURNACES, AND TO DECREASE THE
PILING TEMPERATURE
Filed March 27, 1961
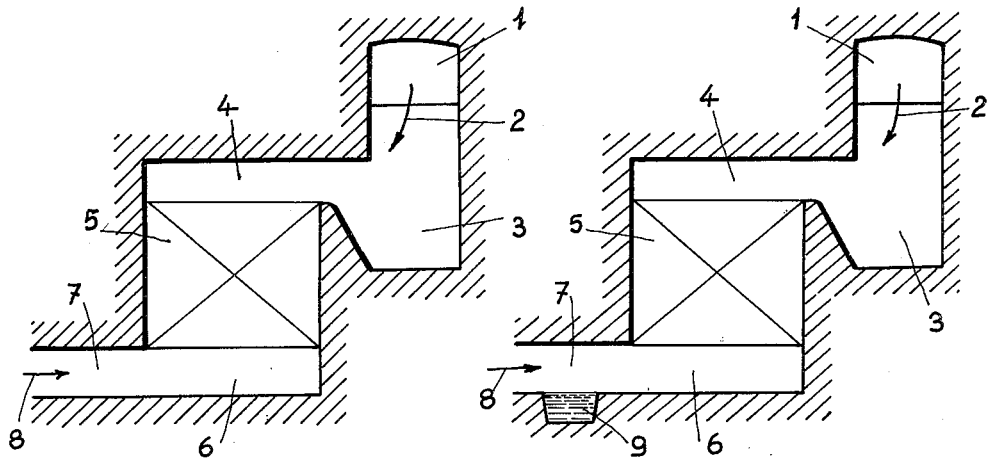
FIG. 1
FIG. 2
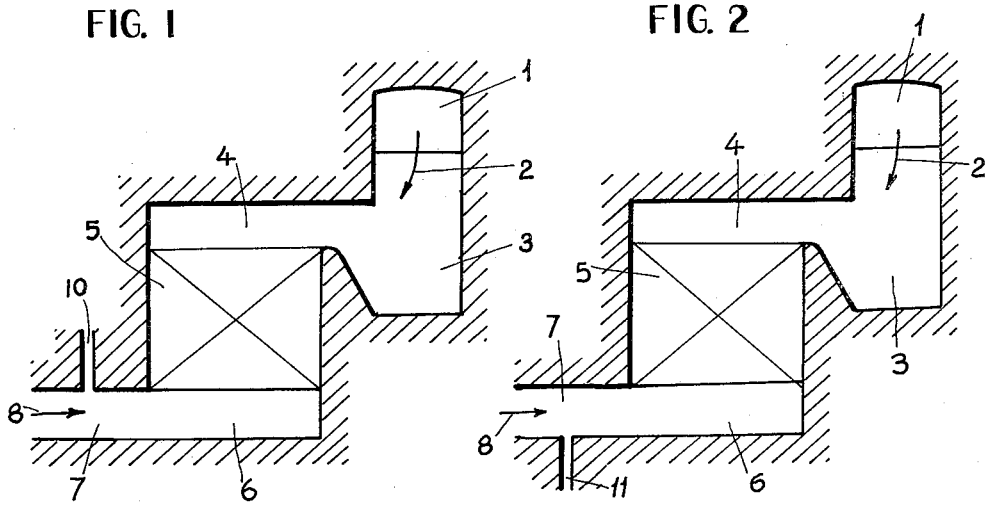
FIG. 3
FIG. 4
INVENTOR.
ALDO RAMACCIOTTI
BY
ATTORNEYS.

3,099,698
METHOD TO INCREASE THE EFFICIENCY OF A FURNACE REGENERATOR, PARTICULARLY FOR OPEN-HEARTH FURNACES, AND TO DECREASE THE PILING TEMPERATURE
Aldo Ramacciotti, Genoa-Pegli, Italy, assignor to Societa Finanziaria Siderurgica Finsider per Azioni-Istituto Siderurgico, Genoa-Cornigliano, Italy
Filed Mar. 27, 1961, Ser. No. 98,354
Claims priority, application Italy Apr. 14, 1960
3 Claims. (Cl. 263—52)

Regenerators and recuperators for industrial furnaces are intended to heat a gas, generally combustion air, at the expense of another gas, generally the combustion products.

The heat exchange takes place in two steps, in the first step the exchange between the hot gases and the checkerwork of refractory bricks of the regenerator is accomplished; in the second step the exchange between the checkerwork and the cold gases.

The regenerator commonly comprises two symmetrical chambers so as the two steps may take place contemporaneously or alternatively inside the two chambers, and the working may be continuous. However, not always the two heat exchanges, between gas and checkerwork and between checkerwork and combustion air, are balanced that is that one of the two fluids gives (or absorbs) heat to the checkerwork more easily than that the other fluid respectively absorbs (or gives) from the checkerwork.

That case occurs especially when the hot gases are smoke or burned gases, and the cold gas is common air. In fact the smoke contains $CO_2$ and $H_2O$ (steam) and transmits a considerable amount of heat to the checkerwork by radiation, as well as by convection, while the air, being transparent to radiations per se, absorbs heat only by convection.

The present invention relates to a method for overcoming the aforesaid disadvantage.

The invention relates also to a modification to the known installations, in order to put into practice said method.

A first object of the invention is to increase in a furnace regenerator, particularly for open-hearth furnaces, the thermic exchange between the checkerwork, the conduit walls respectively, and the air brushing them.

Particularly, an object of the method according to the invention is to increase the thermic exchanges by irradiance between the refractory material and the air.

Another object of the invention is make longer-lasting the checkerwork comprised in the regenerator chambers, owing to a reduction in the temperature, the effects of the checkerwork material remaining unchanged.

The method to increase the efficiency of a furnace regenerator, particularly for open-hearth furnaces, is characterized in that the thermic exchanges for irradiance between the refractory material and the air are increased, by adding to the combustion air a given amount of water, or steam, or other gases, at least partially opaque to the thermic radiation.

The above method to increase the efficiency of a furnace regenerator is also characterized in that:

The connection chambers, or chamber, existing between the checkerwork and the furnace laboratory, within which the thermic exchanges take place mainly by irradiance are preferably enlarged.

The adding of the water, either as liquid or steam, is preferably accomplished before the air contacting the checkerwork and in a variable amount from five to eighty grams/Nm.$^3$ of air according to the humidity in the atmospheric air and to the size of the furnace and of the connection chambers.

The temperature in the checkerwork is decreased owing to the increase of the said thermic exchange between the refractory material and the moistened air, making the checkerwork last longer.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a diagrammatic sectional view through a portion of a conventional open hearth furnace modified to enlarge certain flue passages; and FIGS. 2, 3 and 4 are views similar to FIG. 1 of various furnaces constructed in accordance with the invention.

FIGURE 1 shows in an intermediate vertical section a conventional checkerwork, the connection chambers connecting it to the furnace laboratory and the conduit connecting it to the chimney or to the inlet of the combustion air, being somewhat enlarged over conventional practice.

With reference to FIGURES 2–4: numeral 1 denotes the furnace laboratory; numeral 2 an arrow showing the outlet direction of the combustion hot gases; numerals 3 and 4 two empty connection chambers between the furnace laboratory 1 and the checkerwork 5; numeral 6 a connection chamber between the checkerwork 5 and a conduit 7 for the outlet of the gases bound to the chimney. Numeral 8 denotes an arrow showing the inlet direction of the air, said air goes along conduit 7 in the direction contrary to the one followed by the hot gases coming from the piling, the said air being directed to the piling 5, the hot connection chambers 4 and 3 and to the furnace laboratory 1; numeral 9 a little basin for the humidification of the air brushing it; numeral 10 a piping to introduce into the conduit 7 water in the liquid phase; numeral 11 a piping to introduce into the conduit 7 water in the steam phase.

The heat exchanges between the hot fluid and the walls of the connection chambers and of the checkerwork, and those between the said hot walls and the moistened air, result obvious from what above stated. In a first step the hot gases coming from the laboratory 1 of the open-hearth furnace or the like, come out following the direction of arrow 2 and on passing through the two empty connection chambers 4 and 3, deliver heat by irradiance and convection to the walls of the said chambers; then they pass through the piling 5 delivering to the piling walls the remaining heat and finally go into the connection chamber 6 on their way to the chimney through the conduit 7. In the other step, the air coming from outside goes along the conduit in the contrary direction with respect to the one followed by the gases directed to the chimney, and along said conduit the combustion air is moistened either by brushing the surface of the water contained in the little basin 9, or with water in the liquid phase coming from a pipe 10, or with steam coming from a pipe 11, or in any other way, and then it passes through the connection chamber 6 in order to enter the checkerwork 5, absorbing heat from the checkerwork mainly by convection. The said air passes then through the two empty and hot connection chambers 4 and 3, absorbing heat mainly by irradiance and finally reaches the laboratory 1 of the furnace.

Although for describing reasons the present invention has been described on the ground of what aforestated, many modifications and changes may be made in embodying the method, as for either the shape and volumetric size of the connection chambers, provided between the furnace laboratory and the piling, with respect to the volume of the piling; or the position and choice of the moistening process of the combustion air. All these modifications and changes, however, being based on the main ideas of the invention as set forth in the following claims.

What I claim is:

1. A method of increasing the efficiency of a furnace comprising the steps of burning a fuel in a furnace hearth, heating the refractory material of a regenerator by passing the combustion gases in one direction through the regenerator, forcing atmospheric combustion air from a point of entry through said regenerator in the opposite direction after the regenerator is heated, and introducing into the combustion air at a location near said point of entry a fluid at least partially opaque to thermal radiation in the proportion of 5 to 80 grams per normal cubic meter according to the humidity of the atmospheric air.

2. A method of increasing the efficiency of a furnace according to claim 1 wherein said fluid added to the combustion air is steam.

3. A method of increasing the efficiency of a furnace according to claim 1 wherein said fluid added to the combustion air is water in liquid phase.

References Cited in the file of this patent

UNITED STATES PATENTS

| | | |
|---|---|---|
| 726,861 | Catton | May 5, 1903 |
| 1,339,190 | Fuller | May 4, 1920 |
| 2,171,597 | Parker | Sept. 5, 1939 |